United States Patent
Kamiyama et al.

[11] Patent Number: 5,877,959
[45] Date of Patent: *Mar. 2, 1999

[54] NUMERICAL-CONTROL SYSTEM

[75] Inventors: Eiryou Kamiyama, Chiba; Katsuaki Goto, Ibaraki, both of Japan

[73] Assignee: Hitachi Seiki Co., Ltd., Chiba, Japan

[*] Notice: This patent issued on a continued prosecution application filed under 37 CFR 1.53(d), and is subject to the twenty year patent term provisions of 35 U.S.C. 154(a)(2).

[21] Appl. No.: 749,232

[22] Filed: Nov. 14, 1996

[30] Foreign Application Priority Data

Dec. 12, 1995 [JP] Japan .................................... 7-346334

[51] Int. Cl.⁶ .................................................... G06F 19/00
[52] U.S. Cl. ...................... 364/474.01; 364/136; 364/141
[58] Field of Search ..................... 364/131–136, 364/140–147, 474.01, 474.23, 474.11, 240.2, 140.01–140.1; 340/825.06; 395/282, 308, 309

[56] References Cited

U.S. PATENT DOCUMENTS

| 4,209,847 | 6/1980 | Noda et al. ......................... 364/474.23 |
| 4,943,905 | 7/1990 | Iwagaya et al. ......................... 364/136 |
| 5,283,749 | 2/1994 | Tanahashi ......................... 364/474.01 |
| 5,565,854 | 10/1996 | Kataoka et al. .................... 340/825.06 |
| 5,740,387 | 4/1998 | Lambrecht et al. ..................... 395/309 |

*Primary Examiner*—Paul P. Gordon
*Assistant Examiner*—Steven R. Garland
*Attorney, Agent, or Firm*—Armstrong, Westerman, Hattori, McLeland & Naughton

[57] ABSTRACT

An NC system capable of operating without a delay even if it uses a personal computer of low real-time processing performance. The NC system includes a general-purpose personal computer having a main bus and a plurality of expansion slots on the main bus. An NC board is installed in one of the expansion slots to control a servomotor and so forth. A PLC board is installed in another of the expansion slots to effect sequence control and so forth. The NC board and the PLC board are interconnected by a subbus other than the main bus.

2 Claims, 2 Drawing Sheets

| EXAMPLE OF NC PROGRAM |
|---|
| O0020;<br>N001 G92 X0 Y0 Z0;<br>N002 G90 G00 Z150.0;<br>N003 G43 Z0 H10;<br>N004 S1500 M3;<br>N005 G99 G84 X200.0 Y150.0 Z-105.0 R-50.0 F180;<br>N006 X350.0;<br>N007 G00 X0 Y0 M5;<br>⋮<br>⋮ |

NUMERICAL-CONTROL SYSTEM

BACKGROUND OF THE INVENTION

1. Field of the Invention

The present invention relates to a numerical-control system (hereinafter referred to as "NC system") for machine tools or the like. More particularly, the present invention relates to an NC system that utilizes a general-purpose personal computer (hereinafter referred to as "personal computer").

2. Description of the Related

Recently, with the progress of numerically-controlled machine tools, there has been an increasing demand for NC systems. A typical existing NC system contains a CPU, e.g., a microprocessor, and has a part that analyzes an NC program and sends a control signal to a servomotor for each control axis, and a part that executes sequence control such as tool change. Such an NC system can be realized by using a general-purpose computer. If an NC system is realized by using a personal computer, which is now available at low cost, it is possible to reduce the cost of the NC system. The term "personal computer" used herein means a small-sized general-purpose computer for personal use (for a single user), and it includes FA personal computers (i.e., personal computers for factory use) in addition to so-called OA personal computers (i.e., personal computers for business use).

Recently, with the achievement of high-performance personal computers, it has become possible to realize an NC system using a personal computer capable of real-time processing to a certain level. A conventional NC system utilizing a personal computer is arranged as shown in FIG. 2. A personal computer 1 has a motherboard 2 including a CPU, e.g., a microprocessor, a main memory, an interrupt controller, a bus controller, etc. A main bus 3 is connected to the motherboard 2, and a plurality of expansion slots 4 are provided on the main bus 3. The expansion slots 4 are designed to hold various input/output expansion boards, an interface board for an external storage, etc., and to connect them to the main bus 3, thereby making it possible to expand the functionality of the personal computer 1. The main bus 3 is a bus for connecting the expansion boards and the motherboard 2. The CPU on the motherboard 2 accesses each expansion board through the main bus 3.

An NC board 6 is installed into one of the expansion slots 4 to send a control signal to a servomotor for each control axis. A PLC (Programmable Logic Control) board 7 is installed into another expansion slot 4. The PLC board 7 is used to output a control signal for sequence control and input information concerning the position of each movable member. For example, to forcedly stop a table of a machine tool at a stroke end of the table, the personal computer 1 recognizes that the table has reached the stroke end by accessing the PLC board 7, and outputs a table movement stop instruction to the NC board 6.

Although personal computers have been highly improved in performance, the real-time processing performance thereof is still inadequate for numerical control. In particular, when a nonpreemptive multi-task operation is executed, or when a long-time interrupt occurs for accessing an external storage, for example, there may be a time delay which is unacceptable for real-time processing. When the above-described table is to be brought to an emergency halt at the table end by a personal computer-based NC system having the conventional arrangement, the delay in processing executed by the personal computer 1 causes a delay in detection of the stroke end or a delay in issuing an instruction to the NC board 6, which may cause the table to collide with a stationary member. Such a collision may break the machine tool body.

SUMMARY OF THE INVENTION

An object of the present invention is to provide an NC system capable of operating without a delay even if it uses a personal computer of low real-time processing performance.

The present invention provides an NC system including a general-purpose personal computer having a main bus and a plurality of expansion slots on the main bus. An NC board is installed in one of the expansion slots to control a servomotor and so forth. A PLC board is installed in another of the expansion slots to effect sequence control and so forth. The NC board and the PLC board are interconnected by a subbus other than the main bus.

In the above NC system, it is preferable that the main bus should have a data bus width of at least 16 bits, and the subbus should have a data bus width of 8 bits.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

An embodiment of the present invention will be described below in detail with reference to the accompanying drawings.

Figure 1:
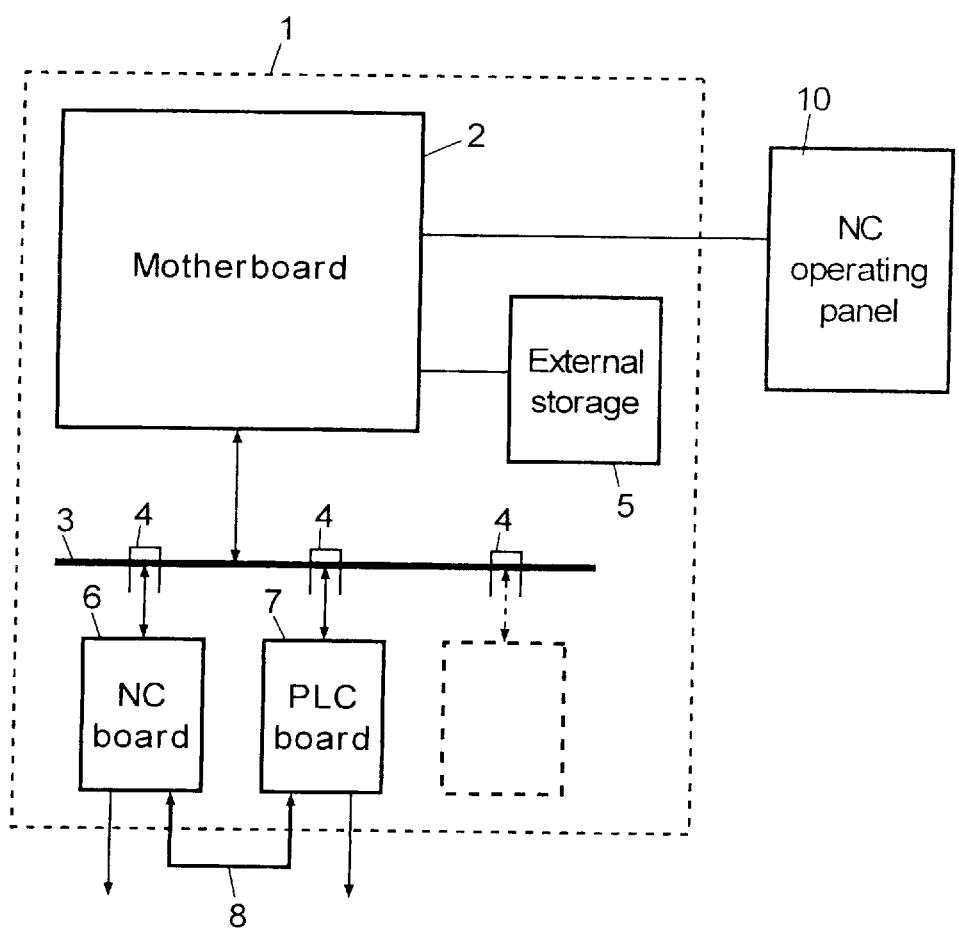
FIG. 1 is a block diagram showing the arrangement of an NC system according to the present invention.

FIG. 1 shows the arrangement of an NC system according to the present invention. A personal computer 1 has a motherboard 2 including a CPU, a main memory, an interrupt controller, a bus controller, etc. The personal computer 1 further has a main bus 3 connected to the motherboard 2, and a plurality of expansion slots 4 provided on the main bus 3. The expansion slots 4 are designed to hold various input/output expansion boards, an interface board for an external storage, etc. and connect them to the main bus 3, thereby making it possible to expand the functionality of the personal computer 1. The main bus 3 is a bus for connecting such expansion boards to the motherboard 2. The CPU on the motherboard 2 accesses each expansion board through the main bus 3. The data bus width of the main bus 3 is either 16 bits or 32 bits.

An external storage 5, which is contained in the personal computer 1, is connected directly to the motherboard 2 without interposing the main bus 3 therebetween. The external storage 5 includes a flexible disk unit, a hard disk unit, a CD-ROM unit, a magneto-optical disk unit, etc. An NC operating panel 10 is connected to the motherboard 2 through a serial port, a CRT interface, etc. The NC operating panel 10 is equipped with a display unit, e.g. a CRT, and a keyboard having film switches, etc., to enable entry and editing of an NC program. The display unit on the NC operating panel 10 can display coordinate values of control axes. In the case of control of a machine tool by way of example, the display unit can also display the position of a tool and the position of a table. If necessary, the NC operating panel 10 may be further equipped with a flexible disk drive or a paper-tape reader as an NC program input unit.

An NC board 6 is installed into one of the expansion slots 4 to send a control signal to a servomotor for each control axis. A PLC (Programmable Logic Control) board 7 is installed into another expansion slot 4. The PLC board 7 is used to output a control signal for sequence control and input information concerning the position of each movable member. If it is possible to integrate the NC board 6 and the PLC board 7 into a single expansion board, only one expansion slot 4 will be necessary to use. With the present mounting technique, however, the NC board 6 and the PLC board 7 must inevitably be installed as two discrete expansion boards to realize ordinary NC functions.

To forcedly stop a table of a machine tool at a stroke end, for example, it is necessary to effect table movement stop control by transmitting a stroke end detecting signal input to the PLC board 7 to the NC board 6 within about 10 msec. In this regard, if the CPU in the motherboard 2 of the personal computer 1 recognizes that the table has reached the stroke end by accessing the PLC board 7 and outputs a table movement stop instruction to the NC board 6 as in the case of the foregoing conventional practice, the system may fail to effect the necessary control within the allowed period of time. Therefore, in the personal computer-based NC system according to the present invention, the NC board 6 and the PLC board 7 are connected directly to each other by a subbus 8 rather than by the main bus 3. Regarding the data bus width of the subbus 8, 8 bits will suffice.

Figures 2, 3:
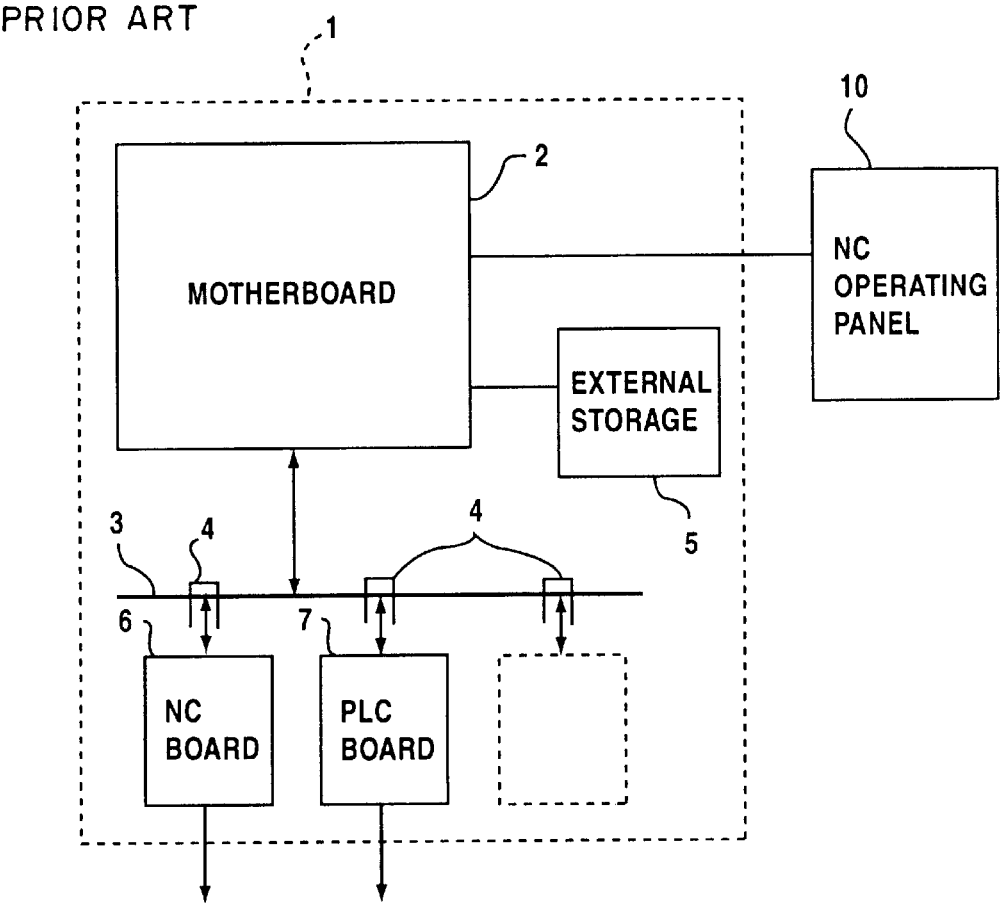
FIG. 2 is a block diagram showing the arrangement of a conventional NC system.
FIG. 3 shows an example of an NC program.

FIG. 3 shows an example of an NC program for machining carried out with a machine tool. Such an NC program is input from the NC operating panel 10 and stored into the external storage 5, which is contained in the personal computer 1, according to an appropriate code, e.g., ASCII. It is also possible to use an NC program prepared by another NC system, a CAD/CAM system, etc., and saved to a flexible disk or a paper-tape. Such an NC program may be read by a flexible disk drive or a paper-tape reader provided on the NC operating panel 10 and stored in a hard disk unit provided as the external storage 5.

The NC program shown in FIG. 3 will be briefly described below. "O0020" in the first row is the program number of this program. "N001" in the next row is the row number of an actual program portion. "G92 X0 Y0 Z0" is an instruction portion of the program. The content of the instruction is to set a workpiece coordinate system. The instruction states that the present tool position is defined as a workpiece coordinate origin (X,Y,Z)=(0,0,0). A portion extending over from the row number (sequence number) to the semicolon ";" at the end of the row (i.e. End of Block: EOB) is called "block". Such NC instructions for the machine tool follow sequentially.

The CPU circuit in the motherboard 2 of the personal computer 1 loads into the main memory an NC program such as that shown in FIG. 3, which has been stored in the external storage 5, and analyzes the NC program to separate it into NC instructions block-by-block. Then, the CPU converts each NC instruction into an instruction format which can be interpreted by the NC board 6, and sends instructions to the NC board 6 after confirming that the NC board 6 is in a receivable state for each instruction in each block. The NC board 6 executes pulse distribution according to the received NC instruction and sends a drive signal to a servo-amplifier of a control motor for each control axis. When the NC instruction buffer is ready to receive an NC instruction upon completion of the present NC instruction, the motherboard 2 is informed that the NC board 6 is in a receivable state. This operation is repeated for each block.

Row "N004" in FIG. 3 instructs that the spindle should be rotated forward (M3) at 1,500 revolutions per minute (S1500). This instruction is sent to the PLC board 7, and the PLC board 7 outputs a control signal to an external I/O board. Thus, NC instructions mixedly include those which are to be executed by the NC board 6 and those which are to be executed by the PLC board 7. The CPU circuit in the motherboard 2 may be arranged to properly distribute these instructions to the two boards. Alternatively, the arrangement may be such that the CPU circuit outputs the instructions to a common I/O address on the main bus 3, and each board discriminately accepts an instruction issued thereto and executes it.

In any case, in order for an NC program such as that shown in FIG. 3 to be executed in regular order according to the sequence of the blocks, it is necessary for either one of the NC and PLC boards 6 and 7 to inform the other of the termination of each NC instruction. In the execution of row "N005" (tapping) in FIG. 3, for example, it is necessary to eliminate a delay in the signal timing for feed control executed by the NC board 6 and spindle reversing control executed by the PLC board 7.

In a conventional NC system such as that shown in FIG. 2, there is no subbus 8. Therefore, an NC instruction termination signal is transmitted through the main bus 3 and via the CPU circuit of the personal computer 1. Consequently, there is a time delay due to a delay in processing executed by the personal computer 1. The time delay may exceed the permissible limit under certain circumstances. In the present invention, the subbus 8 is provided as shown in FIG. 1, and the signals are directly transmitted through the subbus 8. Therefore, the time delay is reduced; there is no time delay that exceeds the permissible limit. Transmission of signals through the subbus 8 is executed directly by a CPU provided on each of the NC and PLC boards 6 and 7 according to a predetermined protocol.

Signals transmitted through the subbus 8 include not only the termination signals for synchronization of the NC program but also a position signal for effecting forced stop of the table at the stroke end and a position signal externally transmitted to execute a deceleration instruction. If a time delay occurs in the transmission of these position signals, the machine tool may be broken by a collision between constituent members thereof, or a positioning error may arise. Accordingly, an allowable time delay is on the order of 10 msec. Such position signals can also be transmitted from the PLC board 7 to the NC board 6 through the subbus 8 with a permissible time delay.

Although in the foregoing embodiment, an NC instruction to the PLC board 7 is sent directly to the PLC board 7 through the main bus 3 by the CPU circuit in the motherboard 2, the arrangement may be such that the CPU circuit in the motherboard 2 temporarily sends the NC instruction to the NC board 6 through the main bus 3, and the NC instruction is sent from the NC board 6 to the PLC board 7 through the subbus 8. In this case, it is not always necessary to send an NC instruction termination signal from the NC board 6 to the PLC board 7.

The present invention, arranged as described above, provides the following advantages:

Even if a personal computer of low real-time processing performance is used, the NC system is capable of operating without a delay. Accordingly, it is possible to improve the reliability and safety of the NC system.

It is possible to attain adequate real-time performance without using a costly personal computer of extremely high processing speed. Accordingly, the production cost of the NC system can be reduced.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A numerical-control system comprising:

a general-purpose personal computer having a main bus and a plurality of expansion slots on said main bus;

an NC board installed in one of said expansion slots to control a servomotor; and a PLC board installed in another of said expansion slots to effect sequence control;

wherein said NC board and said PLC board are interconnected by a subbus other than said main bus to permit direct transmission of numerical-control signals between said NC board and said PLC board.

2. A numerical-control system according to claim 1, wherein said main bus has a data bus width of at least 16 bits, and said subbus has a data bus width of 8 bits.

* * * * *